A. H. STETSON.

Assignor to C. B. WHEELOCK.

CARD OR PRINT HANGER.

No. 10,739. Reissued June 22, 1886.

Witnesses:

S. N. Piper

H. B. Torrey

Inventor.

Amos Henry Stetson.

by R. H. Eddy atty

UNITED STATES PATENT OFFICE.

AMOS HENRY STETSON, OF BROOKLINE, ASSIGNOR TO CHARLES B. WHEELOCK, OF BRAINTREE, MASSACHUSETTS.

CARD OR PRINT HANGER.

SPECIFICATION forming part of Reissued Letters Patent No. 10,739, dated June 22, 1886.

Original No. 312,035, dated February 10, 1885. Application for reissue filed January 4, 1886. Serial No. 187,621.

*To all whom it may concern:*

Be it known that I, AMOS HENRY STETSON, of Brookline, in the county of Norfolk, of the Commonwealth of Massachusetts, have invented a new and useful Improvement in Card or Print Hangers; and I do hereby declare the same to be described in the following specification and represented in the accompanying drawings, of which—

Figure 3:
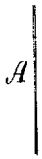
Figure 1:
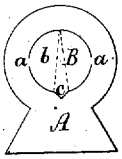
Figure 2:
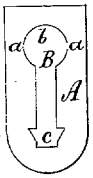
Figure 4:
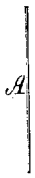
Figure 5:
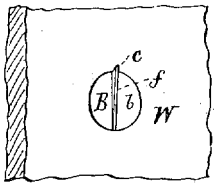
Figure 7:
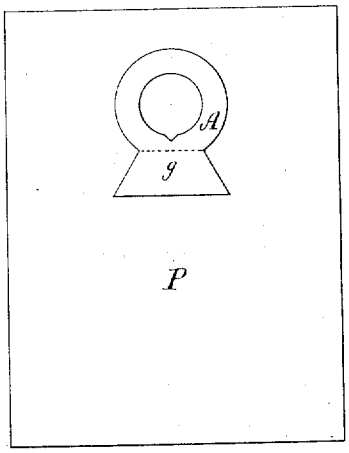
Figure 8:
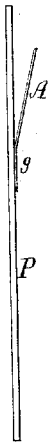
Figure 9:
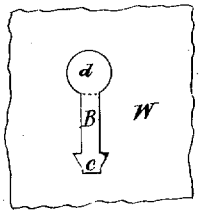
Figure 10:
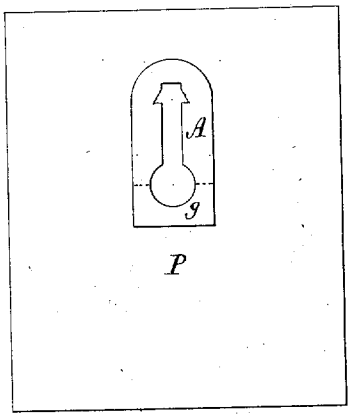

Figures 1 and 2 exhibit front views, and Figs. 3 and 4 edge views, of two forms of hangers containing my invention, the nature of which is defined in the claims hereinafter presented. Fig. 5 is a perspective view, and Fig. 6 a top view, of the form of loop-supporter shown in Fig. 1, such figures exhibiting the application of such supports to a wall or surface. Fig. 7 shows the loop as applied to a print or card, Fig. 8 being an edge view of the two. Fig. 9 is a front view of a wall or surface and the loop-supporter, as shown in Fig. 2, cemented to such wall or surface. Fig. 10 is a rear view of a card or picture having glued to it the loop shown in Fig. 2.

The article in question is made in two parts in a piece of paper, parchment, or other suitable substitute, having one side covered with paste or cement, the inner generally being slightly connected to the outer part, and serving to form the eye thereof, and at the same time a device which, when separated from the loop and cemented to a wall or surface, will answer, on the loop being cemented to a card or print, to enter and sustain such loop in a manner for the hanging of the card or print to the said wall or surface.

In the drawings one of the parts, termed the "loop," is shown at A, and the other, termed the "loop-supporter," is represented at B, the two being stamped in one piece of paper or card, usually with small parts *a a* thereof connecting them to each other, in order that the inner one may be slightly joined to the outer one for preservation before they are used. The part B is formed with an angular or headed tongue, *c*, extending from the body portion *b*. One side of each of the parts A and B is to be covered with gelatine or other proper cement, or is to have such gelatine or cement on the portion that is to be stuck to a surface. The part A, when detached from the part B, becomes a loop in character, and the part B answers the purpose of a hook or device for the loop to be hung upon.

Figure 6:
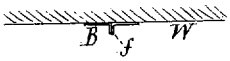

In using the part B of Fig. 1 the cement or gelatine on its back is first to be wet, after which the little projection *c* and the body are to be folded or crimped along their median line, so as to form a triangular projection, *f*, extending from the rest of the body, in manner as shown in Figs. 5 and 6. In this condition the part B is to be cemented to a wall or surface, W. Next, the loop A is to have its lower portion, *g*, glued or cemented to the back of the card or print P, the rest of the loop being separated from the said card or print, as shown in Fig. 8. The loop may next be hung upon the projection *f* or part *c* thereof, whereby the print or card will be hung to the wall. The part A (shown in Fig. 10) has its lower portion, *g*, glued to the picture or print P, the part B having its circular portion *d* cemented to the wall W. The part A is to hang on the free or headed portion *c* of the part B.

I do not confine the said hanger to either of the forms of it as represented, as it may be considerably varied in its form without changing it in character.

I claim—

1. As a new article of manufacture, the card or print hanger, substantially as described, comprising the supporter B, consisting of a piece or disk, *d*, having the tongue or projection *c*, and of the encompassing loop A, formed together in one piece of sheet material, and slightly connected or nearly cut apart, and having on one side of each a layer of gelatine or cement, all being essentially as represented.

2. As a new article of manufacture, the card or print hanger comprising the supporter B, consisting of a piece or disk, *d*, having the tongue or projection *c*, and of the loop A, formed of sheet material, and having on one side of each a layer of gelatine or cement, as set forth.

AMOS HENRY STETSON.

Witnesses:
R. H. EDDY,
S. N. PIPER.